May 18, 1948.    F. J. WILLIAMS    2,441,783
OPTOMETRICAL TESTING DEVICE
Filed April 16, 1945    2 Sheets-Sheet 1
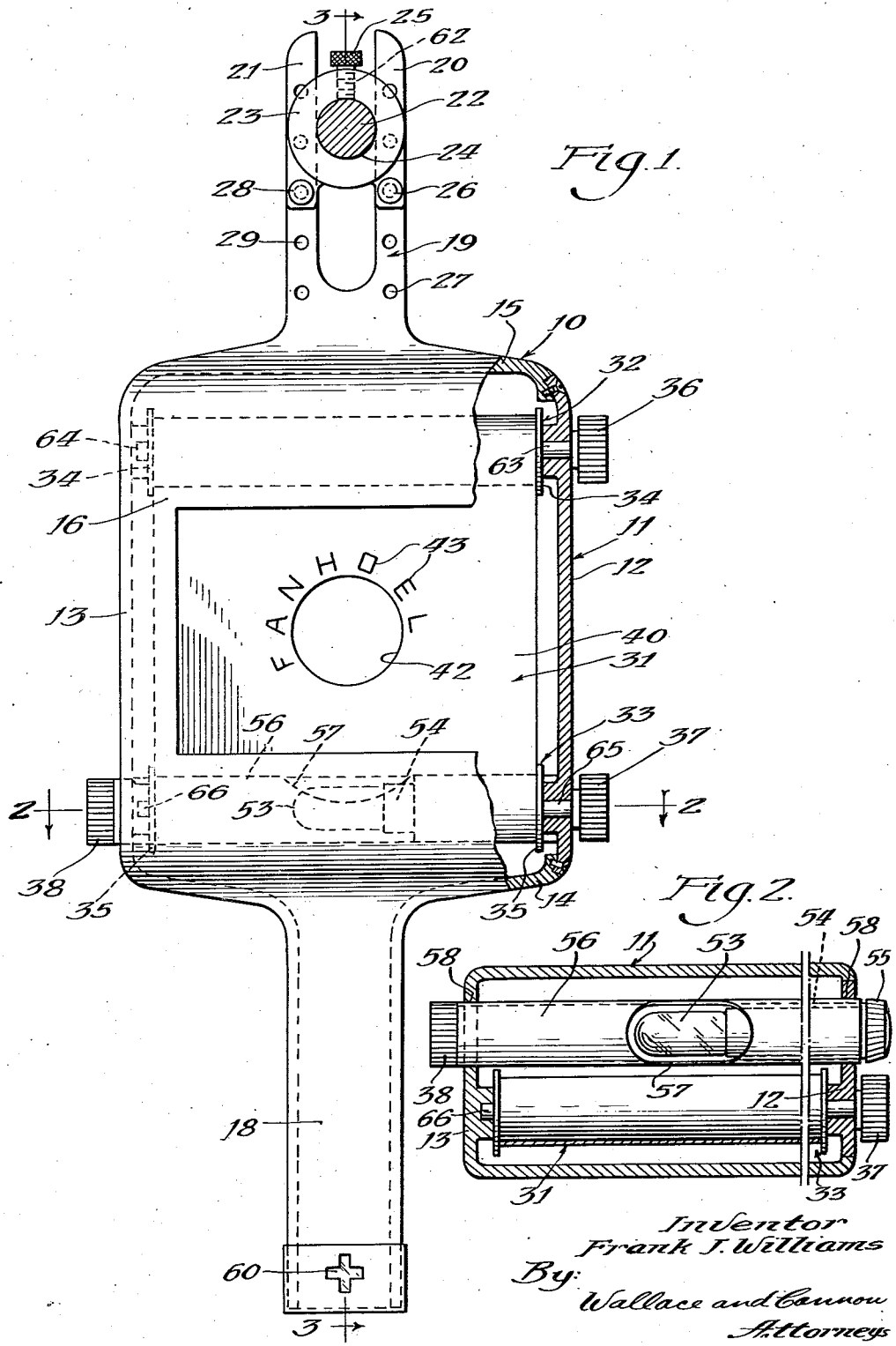

May 18, 1948.  F. J. WILLIAMS  2,441,783
OPTOMETRICAL TESTING DEVICE
Filed April 16, 1945   2 Sheets-Sheet 2
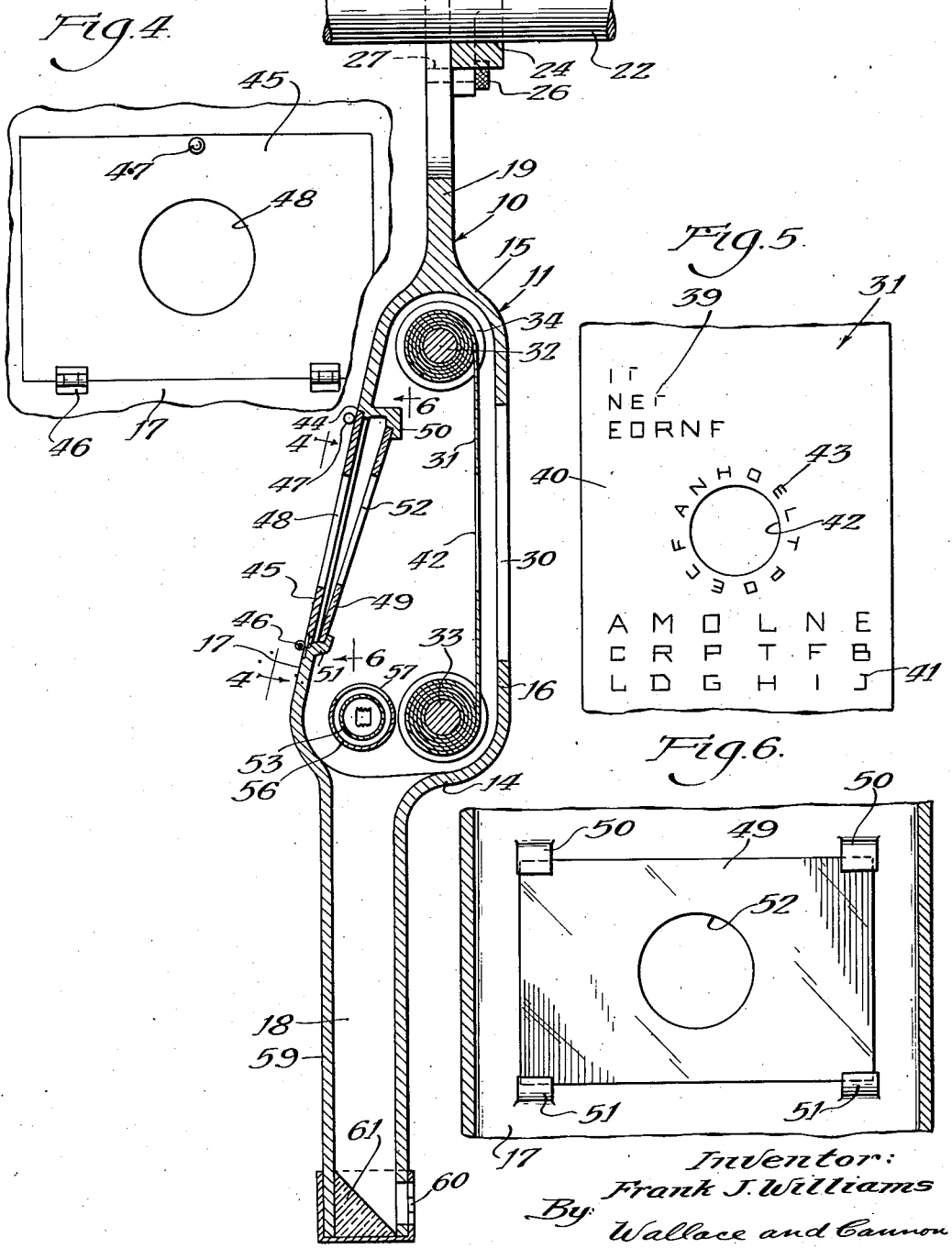
Inventor:
Frank J. Williams
By Wallace and Cannon
Attorneys Patented May 18, 1948

2,441,783

UNITED STATES PATENT OFFICE 2,441,783

OPTOMETRICAL TESTING DEVICE

Frank J. Williams, Waukegan, Ill.

Application April 16, 1945, Serial No. 588,582

11 Claims. (Cl. 88—20)

The present invention relates to an optometrical testing device. The invention further relates to an optometrical testing device in which different light penetrable testing target members can be optionally operated by the optometrist in accordance with the requirements for different optometrical tests. The invention also relates to an optometrical testing device in which a line of sight is provided from the rear of the device through the front thereof toward the patient whose eyes are being tested.

Accordingly, an object of the present invention is to provide a new and improved optometrical device or apparatus for testing and measuring eyes and which in use eliminates the necessity for the use of a multiplicity of separate legend-bearing printed cards heretofore used.

Another object of the invention is to provide a novel optometrical apparatus for making various tests and measurements upon the eyes and which is so constructed and arranged that it has embodied therein all of the devices necessary for an optometrist to perform the various near point tests normally made by a number of separate devices in making optometrical examinations including the reading test for near point visual acuity, the cross cylinder test, the point focus check test for presbyopia, the test for determining near point phoria by the use of prisms, the test for the execution of dynamic skiametry, and a test for determining near point phoria by using the Maddox double prisms and the Greek Cross.

A further object of the invention is to construct and arrange the new optometrical apparatus in such a manner that it may be readily mounted upon and suspended from a support which is embodied in apparatus normally used by optometrists in the practice of their profession.

Other and further objects of the present invention will be apparent from the following description and claims and are illustrated in the accompanying drawings which, by way of illustration, show preferred embodiments and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

Fig. 1 is a view partly in section and partly in elevation illustrating a preferred embodiment of the new optometrical apparatus;

Fig. 2 is a sectional plan view on line 2—2 in Fig. 1;

Fig. 3 is a central vertical sectional view on line 3—3 in Fig. 1;

Fig. 4 is a fragmentary elevational view, on line 4—4 in Fig. 3, illustrating the arrangement of the hinged door in the rear wall of the casing and the arrangement of the sight opening;

Fig. 5 is a fragmentary front elevational view of the flexible band or screen which is embodied in the new optometrical device or apparatus, showing the sight opening provided therein, and showing certain of the legends which may be provided on the flexible band or screen including an annular row of letters of the English alphabet arranged around the sight opening in the screen, and other legends which may be printed or otherwise inscribed on other frames or areas of the screen;

Fig. 6 is a fragmentary elevational view, on line 6—6 in Fig. 3, illustrating a reflecting mirror which is embodied in the new optometrical apparatus and showing the arrangement of the sight opening therein.

A preferred embodiment of the new optometrical apparatus is illustrated in the drawings, and is therein generally indicated at 10, and comprises a casing 11 which may be made of any suitable material, such, for example, as metal, various suitable plastic materials, and the like. The casing 11 includes opposite parallel side walls 12 and 13, a bottom wall 14, a top wall 15, a front wall 16, and a rear wall 17. The casing 11 also includes, preferably as an integral part thereof, an elongated light well or shaft 18 which is substantially smaller or narrower in dimensions than the body of the casing 16, as shown in Figs. 1 and 3. At its upper end the casing 11 is provided with a bifurcated supporting hanger 19 providing a pair of hanger arms 20 and 21. These hanger arms 20 and 21 are adapted to be adjustably mounted upon a horizontal extending supporting rod 22 which may be the horizontal supporting rod now embodied in optometrical apparatus commonly used by optometrists for supporting various instruments and devices. The hanger arm 20 is provided with a row of spaced threaded openings 27 which are selectively adapted to receive a thumb screw 26 and the hanger arm 21 is provided with a corresponding row of threaded openings 29 which are selectively adapted to receive a thumb screw 28.

A sleeve 23 is slidably mounted on the supporting rod 22 and is provided with an annular opening 24 for the reception of the horizontal supporting rod 22. A vertically extending thumb screw 25 is adjustably mounted in a threaded opening 62 which is found in the body of the slidable sleeve 23 and the inner and lower end portion of the thumb screw 25 is adapted to bear upon the upper surface of the horizontal supporting rod 22.

The foregoing arrangement is such that the new optometrical apparatus 10 may be readily adjusted horizontally along and fixed in a selected position on the horizontal supporting rod 22, by manipulating the set screw 25, and may be adjusted as to height by selectively inserting the set screws 26 and 28 into corresponding selected and horizontally aligned openings 27 and 29 in the hanger arms 20 and 21, respectively.

A rectangular-shaped sight opening 30 is provided in the front wall 16 of the casing 11 and this sight opening 30 is preferably of such a size and shape that it will circumscribe or frame one of the rectangular-shaped legend-bearing areas or frames on the flexible band or screen 31 and which will be described presently. Thus the new optometrical device or apparatus includes light penetrable target member comprising a flexible band or screen 31 which is arranged in the casing 11 behind the front wall 16 and this flexible band or screen 31 is adapted to be moved in a plane substantially parallel to the plane of the front wall 16, inwardly of the latter, so as to move the various legend-bearing areas or frames thereon selectively into registration with the sight opening 30 therein. To this end I provide in the upper portion of the casing 11 a feed roll or cylinder 32, the end portions of which are provided with trunnions 63 and 64 which are rotatably journaled in suitable bearing openings provided therefor in the side walls 12 and 13 of the casing 11. In the lower portion of the casing 11 I mount a take-up roll or cylinder 33, the end portions of which are provided with trunions 65 and 66 which are rotatably journaled in suitable bearing openings provided therefor in the side walls 12 and 13 of the casing 11. The feed roll 32 and the take-up roll 33 may be of any suitable design and construction such, for example, as the ordinary spring-urged curtain roll or they may be of the simpler type illustrated in the drawings wherein the feed roll 32 and the take-up roll 33 are shown as simple cylindrical rollers provided with annular guide plates or flanges 34 and 35, respectively, at the ends thereof.

By reference to the drawings it will be noted that the upper or feed roll 32 is provided with a knurled handle knob 36 which is arranged at the right side of the casing 11, as seen from the front wall 16 thereof, and the take-up roll 33 is provided at one end with a knurled handle knob 37.

The flexible band or screen 31 is preferably made of a suitable textile fabric, such as linen, or other suitable material upon which various legends employed in making optometrical tests may be printed or otherwise inscribed. These legends are preferably arranged in substantially rectangular-shaped frames or areas such as are illustrated, for example, at 39, 40 and 41 in Fig. 5, only a few of these area and the legends thereon being shown since the other legends which may be inscribed upon the screen 31 will readily be apparent to optometrists.

By reference to the drawings it will be noted that in the frame or legend-bearing area 40 of the flexible band or screen 31 there is provided a sight opening 42, which is substantially circular in design, and that there is also provided in this frame 40 a legend 43 in the form of an annular row of letters or like characters which are arranged around the perimeter of the sight opening 42.

The rear wall 17 of the casing 11 includes a door opening 44 through which access may be had to the interior of the casing 11 and this door opening 44 is normally closed by a door 45 which is hinged at its lower end, as at 46, upon the rear wall 17 of the casing 11. A suitable handle 47 is provided on the door 45 at the upper end thereof. Formed in the hinged door 45 is a substantially circular sight opening 48 which has substantially the same diameter as the circular sight opening 42 which is formed in the flexible legend-bearing band or screen 31.

A reflecting mirror 49 is mounted in the casing 11, between the flexible legend-bearing band or screen 31, and the hinged door 45 of the rear wall 17, and this mirror 49 is held in position by suitable retaining elements or lugs 50 which may be formed integral with and struck out of the rear wall 17 of the casing adjacent the upper edge of the hinged door 45. Other similar retaining elements or lugs 51, which may also be formed integral with the rear wall 17 of the casing 11, are provided adjacent the lower end of the hinged door 45 for the reception of the lower edge portion of the reflecting mirror 49.

As shown in Figs. 3 and 6 of the drawings, a substantially circular sight opening 52 is provided in the reflecting mirror 49 and this sight opening 52 has substantially the same diameter as the circular sight opening 48 which is provided in the hinged door 45 of the rear wall 17 and substantially the same diameter as the circular sight opening 42 which is provided in the flexible band or screen 31. Likewise, as best shown in Fig. 3 of the drawings, the circular sight opening 52 in the reflecting mirror 49 is disposed in registry with the circular sight opening 48 in the hinged rear door 45 of the casing 11 when said hinged rear door 45 is in its normal and closed position.

A light source 53 is provided in the lower portion of the main body of the casing 11, below the reflecting mirror 49. This light source 53 is preferably in the form of an electric lamp which is mounted in a suitable socket 54. As shown in Fig. 2, the socket 54 is mounted in an opening in the side wall 12 of the casing 11 and is provided with an outlet 55 for the reception of a suitable electric light cord or like attachment. A substantially cylindrical reflector 56 is rotatably mounted in the casing 11, around the light source or lamp 53, this reflector 56 having an open side or light opening 57, as shown in Fig. 3. The end portions of the reflector 56 are journaled in suitable bearing openings, such as 58, which are provided in the side walls 12 and 13 of the casing 11 and at one end thereof the reflector 56 is provided with a knurled handle knob 38.

Formed in the front wall 59 of the relatively narrow light shaft or well 18, at the lower end thereof, is target member comprising a sight opening 60 which preferably has the form of a Greek Cross, and a Maddox reflecting prism 61 is mounted in the bottom or lower end portion of the light well or shaft 18, inwardly of the sight opening 60, as shown in Fig. 3.

It will be noted that the circular sight opening 42 in the flexible legend-bearing band or screen 31 is substantially smaller in diameter than the vertical height of the sight opening 30 in the front wall 16 and that the sight opening 30 in the front wall 16 is of approximately the same size and shape as the legend-bearing areas or frames 39, 40 and 41, etc., on the screen 31.

The use and operation of the new optometrical apparatus will be readily understood by optometrists skilled in the art and science of optometry and is, in general, as follows: In executing certain of the near point eye examinations referred to above the various legend-bearing areas or frames, as 39 and 41, on the flexible band or screen 31 may be moved selectively into registration with the rectangular-shaped sight opening 30 in the front wall 16 of the casing 11. This may be accomplished by manipulating the knurled handle knob 37 on the take-up roll 33 so as to unwind the flexible legend-bearing band or screen 31 off the said feed roll 32 and onto the take-up roll 33.

As the various legends in the legend-bearing frames or areas of the flexible band or screen 31 are thus successively moved into registration with the rectangular-shaped sight opening 30 in the front wall 16 of the casing 11 they will be illuminated by light from the light source or lamp 53, directed by the reflector 56 against the reflecting mirror 49 and thence against the particular legend-bearing area or frame of the screen 31 which is disposed in registration with the sight opening 30 in the front wall 16 of the casing 11. The particular legend-bearing frame or area of the screen 31 which is disposed in registration with the sight opening 30 in the front wall 11 of the screen will thus be illuminated so that the printed legend inscribed thereon may readily be seen by the patient looking through the rectangular-shaped sight opening 30 in the front wall 16 of the casing 11.

In making the test for dynamic skiametry, referred to above, the knob 37 on the take-up roll 33 may be manipulated until the substantially circular sight opening 42 in the screen 31 is moved into registration with the central portion of the rectangular-shaped sight opening 30 in the front wall 16 of the casing 11 and into exact registration with the circular sight openings 52 and 48 in the reflecting mirror 49 and in the hinged rear door 45 of the casing 11, respectively. Light from the light source 53 will then be directed by the reflector 56 against the reflecting mirror 49 and will be reflected by the reflecting mirror 49 through the circular sight opening 42 in the flexible legend-bearing band or screen 31 into the eye of the patient who will then be directed to observe and read and identify the various characters in the annular row of alphabetical letters or like characters 43 which are arranged around the perimeter of the sight opening 42 in the frame 40 of the screen 31 (Fig. 5). During this test for dynamic skiametry the optometrist will observe the eyes of the patient by looking through the then registered sight openings 48, 52 and 42 into the eye of the patient as the patient reads and identifies the characters in the annular legend 43 which is arranged around the perimeter of the circular sight opening 42 in the frame 40 of the screen 31.

A test for near point phoria may be made in the use of the new optometrical apparatus by manipulating the cylindrical reflector 56, by means of its handle knob 38, until the opening 57 in the reflector 56 is directed downwardly so as to reflect light from the light source 53 down through the relatively narrow light well or shaft 18 onto the reflecting prism 61 and thence forwardly through the sight opening 60 which has the form of a Greek Cross. The optometrist may then complete the test for near point phoria, using a phoropter and Maddox double prism and a balancing prism in testing for exophoria and esophoria, and using the thus illuminated Greek Cross 60 as a fixation object, in a manner which will be readily apparent to persons skilled in the art and science of optometry.

It will thus be seen from the foregoing description, considered in conjunction with the accompanying drawings, and as will be readily apparent to optometrists skilled in the art and science of optometry, that the new optometrical apparatus may be employed advantageously in making various optometrical tests referred to above, and others for which it may be readily adapted. Thus it will be seen that the present invention has the desirable advantages and characteristics, and accomplishes its intended objects, including those hereinbefore pointed out and others which are inherent in the invention.

After all of the legends which are inscribed upon the flexible legend-bearing band or screen 31, in the various legend-bearing areas or frames 39, 40 and 41, etc., thereof have been employed in making the various optometrical tests in which such legends are employed the main extent of the flexible legend-bearing band or screen 31 will then be wound upon the take-up well or cylinder 33 from which it may readily be rewound back onto the feed roll or cylinder 32 prior to the examination of the next succeeding patient so that the various legends thereon may be successively moved into registration with the sight opening 30 in the front wall 11 of the casing in the proper order.

Hence, while I have illustrated and described a preferred embodiment of my invention, it is to be understood that this is capable of variation and modification and I therefore do not wish to be limited to the precise details set forth, but desire to avail myself of such changes and alterations as fall within the purview of the following claims.

I claim:

1. An apparatus for making optometrical examinations, comprising a casing including a vertically extending front wall having a sight opening therein, a rear wall substantially parallel to said front wall and having a sight opening disposed in registration with the said sight opening in the said front wall of said casing, a flexible band movably mounted in said casing for movement between said front wall and said rear wall and having a plurality of legend-bearing frames, one of said frames having a sight opening therein, said flexible band having an annular row of characters inscribed thereon around the perimeter of the said sight opening therein for use in making an optometrical test for dynamic skiametry, and means for moving the said flexible band in the said casing relative to and in a plane between said front wall and said rear wall so as to move the said sight opening in the said flexible band into registration with the said sight openings in the said front and rear walls of the said casing, and thereby move said one frame into position to be framed by said first-mentioned sight opening.

2. An apparatus as defined in claim 1 in which the said sight opening in the said front wall of the said casing is substantially rectangular in shape and in which the said sight opening in the said flexible legend-bearing band is substantially circular in shape, and in which the said substantially rectangular-shaped sight opening in the said front wall of the said casing is substantially larger than the said substantially circular opening in the said flexible legend-bearing band so that the said annular row of characters inscribed upon the said flexible legend-bearing band around the perimeter of the said sight opening therein may readily be seen through the said substantially rectangular-shaped sight opening in the said front wall of the said casing when the said substantially annular sight opening in the said flexible legend-bearing band is disposed in registration with the said sight openings in the said front and rear walls of the said casing, and in which the said sight opening in the said rear wall of said casing is also substantially circular in shape and is of substantially the same diameter as the said substantially circular-shaped sight opening in the said flexible legend-bearing band.

3. An apparatus as defined in claim 1 in which said flexible legend bearing band has light penetrable areas therein, and in which the said sight opening in the said front wall of the said casing is substantially rectangular in shape and in which the said sight opening in the said flexible legend-bearing band is substantially circular in shape, and in which the said substantially rectangular-shaped sight opening in the said front wall of the said casing is substantially larger than the said substantially circular opening in the said flexible legend-bearing band so that the said annular row of characters inscribed upon the said flexible legend-bearing band around the perimeter of the said sight opening therein may be readily seen through the said substantially rectangular-shaped sight opening in the said front wall of the said casing when the said substantially annular sight opening in the said flexible legend-bearing band is disposed in registration with the said sight openings in the said front and rear walls of the said casing, and in which the said sight opening in the said rear wall of the said casing is also substantially circular in shape and is of substantially the same diameter as the said substantially circular-shaped sight opening in the said flexible legend-bearing band, and in which said apparatus includes a reflecting mirror arranged in the said casing between the said flexible legend-bearing band and the said rear wall of the said casing and is adapted to reflect light into and through the said sight opening in the said flexible legend-bearing band, and in which said apparatus includes a light source arranged in the said casing for directing light onto the said mirror for reflection thereby against the said flexible band at the inner side of the latter.

4. An apparatus as defined in claim 1 in which said flexible legend bearing band has light penetrable areas therein, and in which the said sight opening in the said front wall of the said casing is substantially rectangular in shape and in which the said sight opening in the said flexible legend-bearing band is substantially circular in shape, and in which the said substantially rectangular-shaped sight opening in the said front wall of the said casing is substantially larger than the said substantially circular opening in the said flexible legend-bearing band so that the said annular row of characters inscribed upon the said flexible legend-bearing band around the perimeter of the said sight opening therein may be readily seen through the said substantially rectangular-shaped sight opening in the said front wall of the said casing when the said substantially annular sight opening in the said flexible legend-bearing band is disposed in registration with the said sight openings in the said front and rear walls of the said casing, and in which the said sight opening in the said rear wall of the said casing is also substantially circular in shape and is of substantially the same diameter as the said substantially circular-shaped sight opening in the said flexible legend-bearing band, and in which said apparatus includes a reflecting mirror arranged in the said casing between the said flexible legend-bearing band and the said rear wall of the said casing and is adapted to reflect light into and through the said sight opening in the said flexible legend-bearing band, and in which said apparatus includes a light source arranged in the said casing for directing light onto the said mirror for reflection thereby into and through the said sight opening in the said flexible legend-bearing band and into and through the said sight opening in the said front wall of said casing.

5. An apparatus as defined in claim 1 in which said flexible legend bearing band has light penetrable areas therein, and in which the said sight opening in the said front wall of the said casing is substantially rectangular in shape and in which the said sight opening in the said flexible legend-bearing band is substantially circular in shape, and in which the said substantially rectangular-shaped sight opening in the said front wall of the said casing is substantially larger than the said substantially circular sight opening in the said flexible legend-bearing band so that the said annular row of characters inscribed upon the said flexible legend-bearing band around the perimeter of the said sight opening therein may be readily seen through the said substantially rectangular-shaped sight opening in the said front wall of the said casing when the said substantially annular sight opening in the said flexible legend-bearing band is disposed in registration with the said sight openings in the said front and rear walls of the said casing, and in which the said sight opening in the said rear wall of the said casing is also substantially circular in shape and is of substantially the same diameter as the said substantially circular-shaped sight opening in the said flexible legend-bearing band, and in which said apparatus includes a reflecting mirror arranged in the said casing between the said flexible legend-bearing band and the said rear wall of the said casing and is adapted to reflect light into and through the said sight opening in the said flexible legend-bearing band, and in which said apparatus includes a light source arranged in the said casing for directing light against the said reflecting mirror for reflection thereby against the inner surface of the said flexible legend-bearing band and into and through the said sight opening in the said flexible legend-bearing band, and in which the said reflecting mirror has a sight opening formed therein centrally thereof and which is disposed forwardly of and in registration with the said sight opening in the said rear wall of the said casing.

6. An apparatus as defined in claim 1 in which said flexible legend bearing band has light penetrable areas therein, and in which the said sight opening in the said front wall of the said casing is substantially rectangular in shape and in which the said sight opening in the said flexible legend-bearing band is substantially circular in shape, and in which the said substantially rectangular-shaped sight opening in the said front wall of the said casing is substantially larger than the said substantially circular opening in the said flexible legend-bearing band so that the said annular row of characters inscribed upon the said flexible legend-bearing band around the perimeter of the said sight opening therein may be readily seen through the said substantially rectangular-shaped sight opening in the said front wall of the said casing when the said substantially circular sight opening in the said flexible legend-bearing band is disposed in registration with the said sight openings in the said front and rear walls of the said casing, and in which the said sight opening in the said rear wall of the said casing is also substantially circular in shape and is of substantially the same diameter as the said substantially circular-shaped sight opening in the said flexible legend-bearing band, and in which said apparatus includes a reflecting mirror arranged in the said casing between the said flexible legend-bearing band and the said rear wall of the said casing and is adapted to reflect light into and through the said sight opening in the said flexible legend-bearing band or against the inner surface of the latter, and in which said apparatus includes a light source arranged in the said casing for directing light against the said reflecting mirror for reflection thereby into and through the said sight opening in the said flexible legend-bearing band and against the inner surface of the latter, and in which the said reflecting mirror has a sight opening formed therein centrally thereof and disposed forwardly of and in registration with the said sight opening in the said rear wall of the said casing, and in which the said sight opening in the said reflecting mirror is substantially circular in shape and is of substantially the same diameter as the said sight opening in the said rear wall of the said casing and the said sight opening in the said flexible legend-bearing band.

7. An apparatus for making optometrical examinations comprising a casing having front and rear walls, said front wall having an opening therein, a legend-bearing frame having an opening therein, means carried by said casing for supporting said legend-bearing frame within said casing with the opening therein in alignment with the opening in said front wall and in such position that said legend bearing frame may be readily seen from outside said casing through said opening in said front wall, said rear wall including a door having an opening therein in alignment with the openings in said frame and said front wall, a light source mounted within said casing to the rear of said frame, mounting means carried by said rear wall and extending inwardly therefrom, and a mirror mounted in said mounting means and positioned to reflect light from said light source to thereby illuminate said frame and direct light through the openings in said frame and said front wall, said mirror having an opening aligned with the openings in said rear door, said front wall and said frame.

8. An optometrical testing device including a casing having top, bottom, front and rear walls, said front wall having an opening therein, supporting means extending from the top of said casing for adjustably supporting the same, an elongated closed bottomed light well extending from the bottom of said casing, said light well having substantially less cross sectional area than the casing, a first light penetrable target member within the casing in alignment with the opening in the front wall and disposed rearwardly thereof, a reflector disposed rearwardly of said target member and adapted to reflect light therethrough, a second light penetrable target member at the lower end of said light well, a reflector mounted within the lower end of the light well and disposed rearwardly of the said second target member and adapted to reflect rays of light therethrough, a light source within the casing and spaced from and out of alignment with said opening and said first target member and a movably mounted reflector cooperatively disposed adjacent said light source for optionally directing the rays of light from the light source to the reflector disposed rearwardly of the first mentioned light penetrable target member thence through said target member and the opening in the front wall of the casing or from the light source to the reflector at the bottom of the said light well, and thence to and through the said adjacent second target member.

9. An optometrical testing device as claimed in claim 8 in which said first mentioned target member is movable within the casing and the second target member is fixed at the lower end of the light well.

10. An optometrical testing device as claimed in claim 8 in which said supporting means include vertical adjusting means for the casing and means permitting horizontal longitudinal adjustment thereof.

11. An optometrical testing device as claimed in claim 8 in which the reflector disposed rearwardly of the said first mentioned target member has an opening therein substantially in alignment with said target member and the opening in the front wall of the casing providing a line of sight through said reflector toward said target member and said opening in the front wall of the casing.

FRANK J. WILLIAMS.

REFERENCES CITED

The following references are of record in the file of this patent:

UNITED STATES PATENTS

| Number | Name | Date |
| --- | --- | --- |
| 726,101 | Reich et al. | Apr. 21, 1903 |
| 929,134 | Hughes | July 27, 1909 |
| 944,853 | Gantt | Dec. 28, 1909 |
| 968,981 | Reese et al. | Aug. 30, 1910 |
| 1,218,082 | Hall | Mar. 7, 1917 |
| 1,353,372 | Woodhull | Sept. 21, 1920 |
| 1,647,016 | Reaves | Oct. 25, 1927 |
| 1,720,035 | DeZeng | July 9, 1929 |
| 1,755,705 | Reid | Apr. 22, 1930 |
| 1,791,604 | Reardon | Feb. 10, 1931 |
| 1,804,151 | Copeland | May 5, 1931 |
| 1,807,520 | Forshey | May 26, 1931 |
| 1,927,111 | Carpenter | Sept. 19, 1933 |
| 2,225,846 | Russell | Dec. 24, 1940 |

FOREIGN PATENTS

| Number | Country | Date |
| --- | --- | --- |
| 7,160 | Great Britain | Apr. 1, 1908 |